(12) United States Patent
Al-Naffouri et al.

(10) Patent No.: US 8,194,799 B2
(45) Date of Patent: Jun. 5, 2012

(54) CYCLIC PREFIX-BASED ENHANCED DATA RECOVERY METHOD

(75) Inventors: Tareq Y. Al-Naffouri, Dhahran (SA); Ahmed Abdul Quadeer, North Karachi (PK)

(73) Assignee: King Fahd University of Pertroleum & Minerals, Dhahran (SA)

(*) Notice: Subject to any disclaimer, the term of this patent is extended or adjusted under 35 U.S.C. 154(b) by 530 days.

(21) Appl. No.: 12/385,076

(22) Filed: Mar. 30, 2009

(65) Prior Publication Data
US 2010/0246730 A1    Sep. 30, 2010

(51) Int. Cl.
*H04L 27/06* (2006.01)
(52) U.S. Cl. ......... 375/341; 375/340; 375/316; 375/262
(58) Field of Classification Search .................. 375/341, 375/340, 316, 262, 260, 149, 267; 704/242; 714/795; 370/208, 203, 210
See application file for complete search history.

(56) References Cited

U.S. PATENT DOCUMENTS

| | | | |
|---|---|---|---|
| 6,327,314 B1 | 12/2001 | Cimini, Jr. et al. | |
| 6,983,029 B2 | 1/2006 | Alavi et al. | |
| 7,133,355 B1 | 11/2006 | Gerakoulis | |
| 7,139,321 B2 | 11/2006 | Giannakis et al. | |
| 7,280,606 B2 | 10/2007 | Kim et al. | |
| 7,292,651 B2 | 11/2007 | Li | |
| 7,327,699 B1 | 2/2008 | Miyato et al. | |
| 7,397,839 B2 | 7/2008 | Maeda et al. | |
| 7,426,204 B2 | 9/2008 | Lee et al. | |
| 7,453,792 B2 | 11/2008 | Chadha et al. | |
| 7,483,492 B2 | 1/2009 | Feher | |
| 7,609,782 B2* | 10/2009 | Giannakis et al. ............ 375/299 |
| 7,639,733 B1* | 12/2009 | Lee et al. ...................... 375/149 |
| 7,729,435 B2* | 6/2010 | Ismail et al. .................. 375/260 |
| 2003/0177003 A1* | 9/2003 | Souilmi et al. ................ 704/216 |
| 2006/0050626 A1* | 3/2006 | Yucek et al. .................. 370/208 |
| 2006/0140292 A1* | 6/2006 | Blasco Claret et al. ....... 375/260 |
| 2007/0133695 A1 | 6/2007 | Kotzin | |
| 2007/0258529 A1 | 11/2007 | Liang et al. | |
| 2007/0268974 A1* | 11/2007 | Chun et al. .................... 375/260 |
| 2008/0037611 A1* | 2/2008 | Coon ............................. 375/145 |
| 2008/0152033 A1 | 6/2008 | Gore et al. | |
| 2009/0041135 A1* | 2/2009 | Ismail et al. .................. 375/260 |

FOREIGN PATENT DOCUMENTS

| | | |
|---|---|---|
| GB | 2447972 | 10/2008 |
| WO | WO2007111448 | 10/2007 |
| WO | WO2008020791 | 2/2008 |

OTHER PUBLICATIONS

TTaejoon kim et al ("Reliable blind estimation scheme based on cross-correlated cyclic prefic for OFDM system", ICACT2006, FFeb 20-22, 2006, pp. 3-5).*

* cited by examiner

*Primary Examiner* — Shuwang Liu
*Assistant Examiner* — Helene Tayong
(74) *Attorney, Agent, or Firm* — Richard C. Litman

(57) ABSTRACT

The cyclic prefix-based enhanced data recovery method retains the cyclic prefix (CP) upon reception and routes the CP to a data detection module to enhance the operation of the orthogonal frequency division multiplexed (OFDM) receiver whether operating in the blind, semi-blind, training, or perfectly known channel modes. Processing of the OFDM symbol and the CP is performed in the data detector and obtains data recovery by computing a maximum likelihood estimation based on the CP and the OFDM symbols.

9 Claims, 16 Drawing Sheets

CYCLIC PREFIX-BASED ENHANCED DATA RECOVERY METHOD

BACKGROUND OF THE INVENTION

1. Field of the Invention

The present invention relates to digital transmission techniques, and particularly to a cyclic prefix-based enhanced data detection method especially suited for the Orthogonal Frequency Division Multiplexing (OFDM) transmissions in the case of wired transmissions, or for Orthogonal Frequency Division Multiple Access (OFDMA) transmissions in the case of wireless transmissions.

2. Description of the Related Art

In a communication system, a transmitter sends data to a receiver through a channel. In the case of a wireless channel, the transmitted waveforms suffer from multipath fading due to reflection, refraction, and diffraction, which ultimately results in intersymbol interference (ISI) between the transmitted symbols. The motive of modern broadband wireless communication systems is to offer high data rate services. The main hindrance for such high data rate systems is multipath fading, as it results in ISI. It therefore becomes essential to use such modulation techniques that are robust to multipath fading.

Multicarrier techniques, especially Orthogonal Frequency Division Multiplexing (OFDM) (as used herein, the term Orthogonal Frequency Division Multiplexing is used to refer to frequency division multiplexing in both wired and wireless communications systems; hence it also encompasses Orthogonal Frequency Division Multiple Access) has emerged as a modulation scheme that can achieve high data rate by efficiently handling multipath effects. The additional advantages of simple implementation and high spectral efficiency due to orthogonality contribute towards the increasing interest in OFDM. This is reflected by the many standards that considered and adopted OFDM, including those for digital audio and video broadcasting (DAB and DVB), WIMAX (Worldwide Interoperability for Microwave Access), high speed modems over digital subscriber lines, and local area wireless broadband standards, such as the HIPERLAN/2 and IEEE 802.11a, with data rates of up to 54 Mbps. OFDM is also being considered for fourth-generation (4G) mobile wireless systems.

In order to achieve high data rate in OFDM, receivers must estimate the channel efficiently, and subsequently the data. The receiver also needs to be of low complexity and should not require too much overhead. The problem becomes especially challenging in the wireless environment when the channel is time-variant.

The techniques used for estimating the channel impulse response can be broadly divided into training-based, blind, and semi-blind techniques. In training-based technique, pilots, i.e., symbols that are known to the receiver, are sent with the data symbols. In the blind technique, the channel is estimated by using the structure of the communication problem, i.e., the natural constraints on data and channel, which include the finite alphabet constraint, the cyclic prefix, linear preceding, time and frequency correlation, and many more. Semi-blind techniques make use of both pilots and the natural constraints to efficiently estimate the channel.

Thus, an OFDM cyclic prefix-based enhanced data recovery method solving the aforementioned problems is desired.

SUMMARY OF THE INVENTION

The cyclic prefix-based enhanced data recovery method retains the cyclic prefix (CP) upon reception and routes the CP to a data detection module to enhance the operation of the OFDM receiver, whether operating in the blind, semi-blind, training or perfectly known channel modes. Processing of the OFDM symbol and the CP is performed in the data detector, and comprises data recovery by computing a maximum likelihood estimation based on the CP and the OFDM symbols.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The cyclic prefix-based enhanced data recovery method retains the cyclic prefix (CP) upon reception and routes the CP to a data detection module to enhance operation of the OFDM receiver, whether operating in the blind, semi-blind, training, or perfectly known channel modes. Processing of the OFDM symbol and the CP is performed in the data detector, and comprises data recovery by computing a maximum likelihood estimation based upon the CP and the OFDM symbols.

Figure 1:
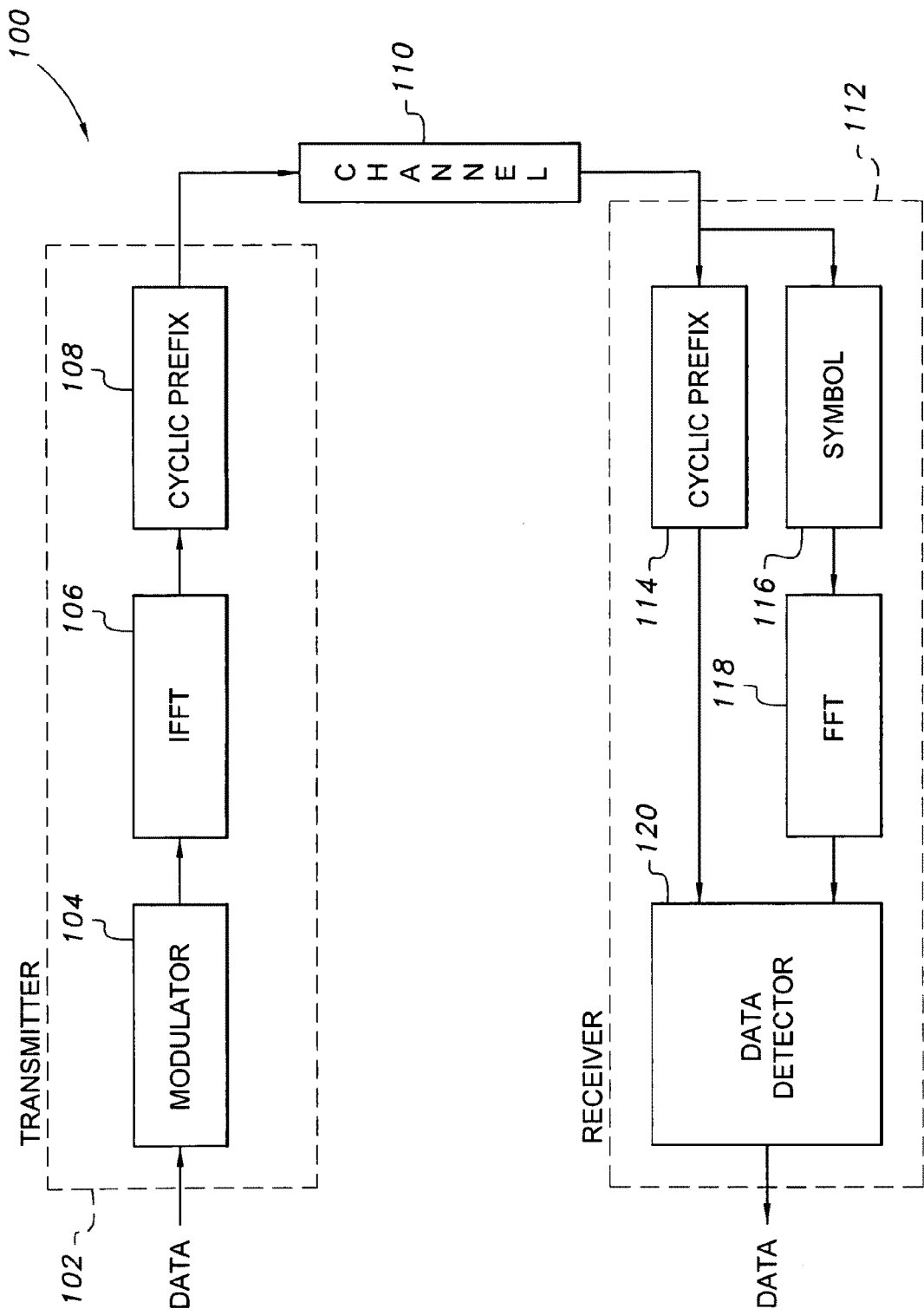
FIG. 1 is a block diagram showing a simple communication system that uses the cyclic prefix enhanced data recovery method according to the present invention.

As shown in FIG. 1, the cyclic prefix-based enhanced data recovery method utilizes a transmitter 102 having a modulator 104, an inverse Fast Fourier Transform (IFFT) processor 106, and a cyclic prefix generator 108. A communications channel 110 is established in which receiver 112 recovers the transmitted data. Cyclic prefix recovery module 114 identifies the cyclic prefix (CP) and forwards it to data detector 120. Symbol recovery module 115 has an output that feeds the fast Fourier transform (FFT) module 118. Output of the FFT module 118 is then routed to the data detector 120, where both the CP and symbols are processed to recover the data that was input at the transmitter 102.

The cyclic prefix-based enhanced data recovery method provides an efficient blind data detection technique for OFDM transmission over wireless media. Channel identification and equalization is performed from output data only (i.e., OFDM output symbol and associated CP), without the need for a training sequence or a priori channel information. The technique makes use of a number of natural constraints, which include the finite delay spread of the channel impulse response, the finite alphabet constraint on the data, and the cyclic prefix. This technique is based on the transformation of the linear OFDM channel into two parallel sub-channels due to the presence of a cyclic prefix at the input. One is a cyclic sub-channel that relates the input and output OFDM symbols, and thus is free of any ISI effects and is best described in the frequency domain. The other sub-channel is a linear sub-channel that carries the burden of ISI and that relates the input and output prefixes through linear convolution. This channel is best studied in the time domain.

It can be shown that the two sub-channels are characterized by the same set of parameters (or impulse response (IR)) and are driven by the same stream of data. They only differ in the way in which they operate on the data (i.e., linear vs. circular convolution). This fact enables us to estimate the IR from one sub-channel and eliminate its effect from the other, thus obtaining a nonlinear relationship that involves the input and output data only. This relationship can, in turn, be optimized for the ML data estimate, something that can be achieved through exhaustive search (in the worst case scenario).

The relationship takes a particularly simple form in constant modulus case. Exhaustive search is computationally very expensive. Two approaches have been suggested to reduce the computational complexity. In the first approach, the Genetic Algorithm (GA) is used to directly solve the nonlinear problem. The second approach describes a semi-blind algorithm in which we use Newton's method to estimate the data when it is initialized with an estimate obtained using a few pilots.

Moreover, the cyclic prefix-based enhanced data recovery method utilizes the CP to enhance the operation of the equalizer when the channel is perfectly known at the receiver or is obtained through training. Specifically, the CP observation enhances the BER performance, especially when the channel exhibits zeros on the FFT grid.

Persons having ordinary skill in the art recognize that a simple communication system may comprise a transmitter that sends data to a receiver through a channel. The transmitter may be any equipment that is able to generate Orthogonal Frequency Division Multiplexing (OFDM) modulated data, e.g., a wireless local area network (WLAN) hub, a satellite, a mobile base station, or the like. The receiver may be any equipment capable of receiving OFDM modulated data, e.g., a laptop, a mobile phone, a personal digital assistant (PDA), or the like. A cyclic prefix (CP) may be present in the channel transmission and discarded at a front end of the receiver. When the transmitted data passes through the channel, it is corrupted by the effect of channel, e.g., fading, and thus cannot be recovered at the receiver. OFDM has emerged as an efficient multicarrier modulation technique, which has been adopted by many standards, including, for example, without limitation, HIPERLAN/2 and IEEE 802.11a The cyclic prefix-based enhanced data recovery method improves the aforementioned simple communication system by not discarding the CP, but rather utilizing the CP in a data detection portion of the receiver along with the OFDM symbol.

As shown in FIG. 1, at the transmitter 102, the data bits (binary digits) are first modulated in the modulator 104 using either Binary Phase Shift Keying (BPSK) or Quadrature Amplitude Modulation (QAM) i.e. the bits are converted to discrete symbols taken from a finite alphabet set (e.g., +1 or −1 in the case of BPSK). The symbols are transmitted in the form of blocks of length N, known as OFDM symbols. The modulated data then passes through the IFFT block 106, in which N-point Inverse Fast Fourier Transform (IFFT) of modulated data takes place. The cyclic prefix generator 108 introduces redundancy into the process by appending the cyclic prefix (cyclic extension of modulated data) of length L to the OFDM symbol x to avoid intersymbol-interference (ISI). Thus, the data block that is transmitted through the channel 110 has N+L symbols.

The receiver 112 receives the output data, which is the transmitted data convolved by the channel effect h and corrupted by noise n. At the symbol processor 116, the cyclic prefix, which carries all the effect of ISI, is removed from the received data (of length N+L). The FFT module 118 performs N-point Fast Fourier Transform (FFT) of the resulting OFDM symbol y. The post-FFT OFDM symbol along with the cyclic prefix is then fed into the Data Detector 120, which detects the data using the finite alphabet property of data.

Figure 2:
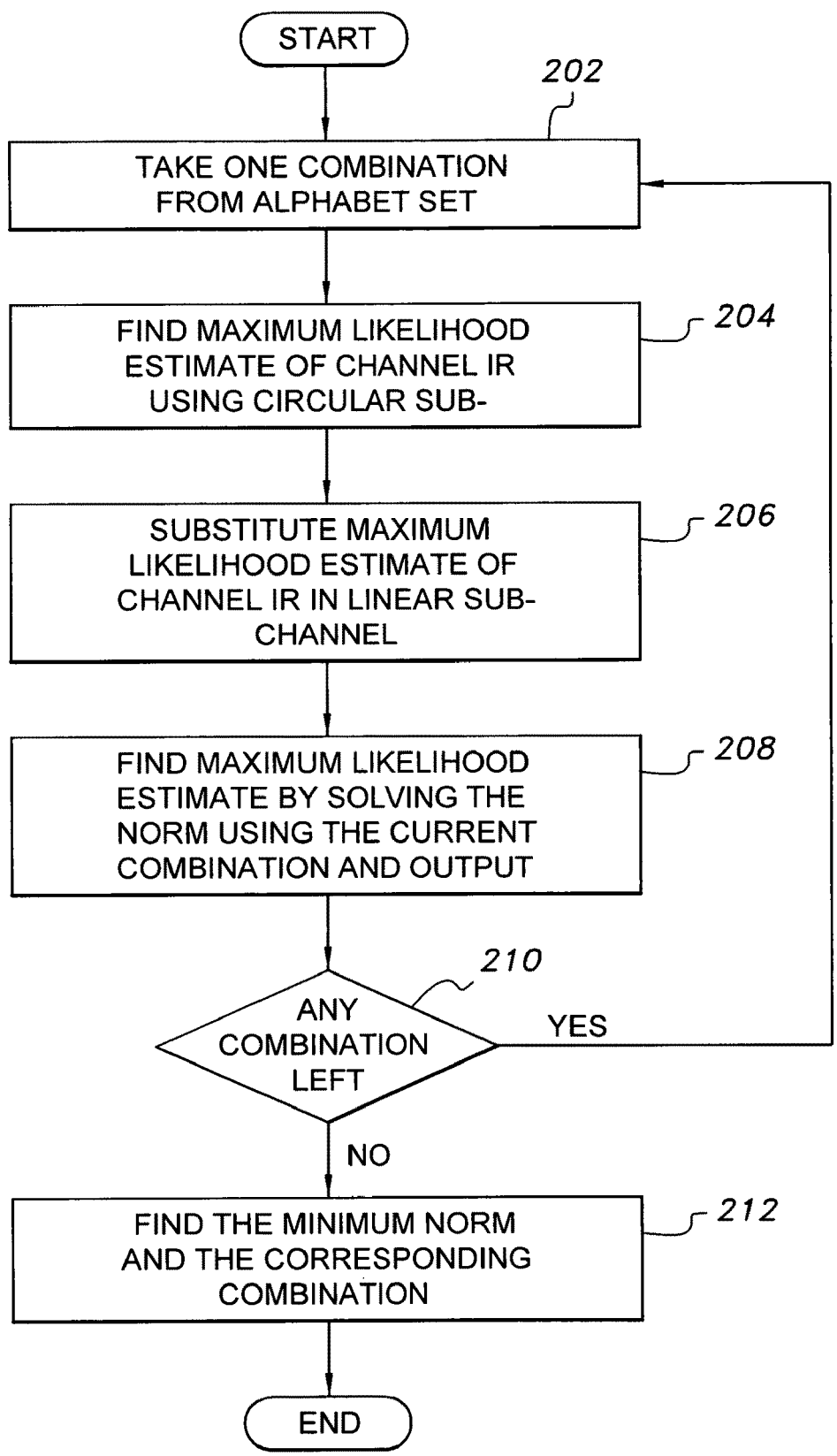
FIG. 2 is a flowchart showing operational details of a blind data detector using the cyclic prefix enhanced data recovery method according to the present invention.

As shown in FIG. 2, at step 202 the blind data detector method first selects a particular alphabet combination from the finite alphabet set. The channel h of length L+1 can be divided into two sub-channels due to the presence of cyclic prefix at the input. One is the circular sub-channel, and the other sub-channel is the linear sub-channel. The input/output equation of circular sub-channel at a particular time his given by:

$$Y_i = H_i \odot X_i + N_i \qquad (1)$$

where $Y_i$, $H_i$, $X_i$, and $N_i$ are N-point FFT of $y_i$, $h_i$ (length-N zero-padded version of $h_i$), $x_i$ and $n_i$, and $\odot$ stands for element-by-element multiplication. The input/output equation of linear sub-channel is given by:

$$\underline{y_i} = X_i \underline{h_i} + \underline{n_i} \qquad (2)$$

where $y_i$ corresponds to the cyclic prefix of output, * stands for convolution, and $X_i$ is a matrix composed of CP of current (unknown) and previous (known) OFDM symbol and it can be written as $$X_i X_{Li} + X_{Ui-1} \qquad (3)$$

where:

-continued $$X_{Ui-1} = \begin{bmatrix} 0 & x_{i-1}(L-1) & \cdots & x_{i-1}(0) \\ 0 & 0 & \cdots & x_{i-1}(1) \\ \vdots & \ddots & \ddots & \vdots \\ 0 & \cdots & 0 & x_{i-1}(L-1) \end{bmatrix} \text{ and }$$

$$X_{Li} = \begin{bmatrix} x_i(0) & 0 & \cdots & 0 \\ x_i(1) & x_i(0) & \cdots & 0 \\ \vdots & \ddots & \ddots & \vdots \\ x_i(L-1) & \cdots & x_i(0) & 0 \end{bmatrix}$$

where:

As $h_i$ corresponds to the first L+1 elements of $h_i$, we obtain the following time-frequency relationship from linear sub-channel input/output equation:

$$\underline{y}_i = \underline{X}_i Q_{L+1} H_i + \underline{n}_i \quad (4)$$

where $Q_{L+1}$ corresponds to the first L+1 rows of the IFFT matrix Q. The maximum likelihood (ML) estimate of channel subjected to the constraint that $h_i$ corresponds to the first L+1 elements of $h_i$, can be found by using only the circular sub-channel (step 204), which is given by:

$$H_i^{ML} = [I - |D_X|^{-2} Q^*_{N-L-1} (Q_{N-L-1} |D_X|^{-2} Q^*_{N-L-1})^{-1} Q_{N-L-1}] D_X^{-1} Y_i \quad (5)$$

where $D_X$ is a diagonal matrix with elements of $X_i$ on diagonal. Upon replacing $H_i$ that appears in the time-frequency relationship (corresponding to the linear sub-channel) with its Maximum Likelihood estimate as performed at step 206, we obtain:

$$\underline{y}_i = \underline{X}_i Q_{L+1} [I - |D_X|^{-2} Q^*_{N-L-1} (Q_{N-L-1} |D_X|^{-2} Q^*_{N-L-1})^{-1} Q_{N-L-1}] D_X^{-1} Y_i + \underline{n}_i \quad (6)$$

This is an input/output relationship that does not depend on any channel information whatsoever. Since the data is assumed deterministic, maximum-likelihood estimation of step 204 is the optimum way to detect it, i.e., solving the norm at step 208, we minimize:

$$X_i^{ML} = \arg\min_{X^i} \|\underline{y}_i - \underline{X}_i Q_{L+1} [I - |D_X|^{-2} Q^*_{N-L-1} (Q_{N-L-1} |D_X|^{-2} Q^*_{N-L-1})^{-1} Q_{N-L-1}] D_X^{-1} Y_i\|^2 \quad (7)$$

This is a nonlinear least-squares problem in the data. In the case of constant modulus data (e.g. BPSK/4QAM), the above problem reduces to the following:

$$X_i^{ML} = \arg\min_{X^i} \|\underline{y}_i - (1/E_x) Q_{L+1} Y_i \odot X_i^*\|^2 \quad (8)$$

where $E_x$ is the energy of the symbol (e.g., $E_x$=1 for BPSK and $E_x$=2 for 4QAM). The above norm is solved for the particular combination of alphabets selected. As shown in decision step 210, the process continues until the value of norms for all the combinations is evaluated. As shown in minimum norm finding step 212, the combination of alphabets for which the value of the norm is minimum is the desired data. This method of exhaustive search over all combinations is computationally very expensive.

Figure 3:
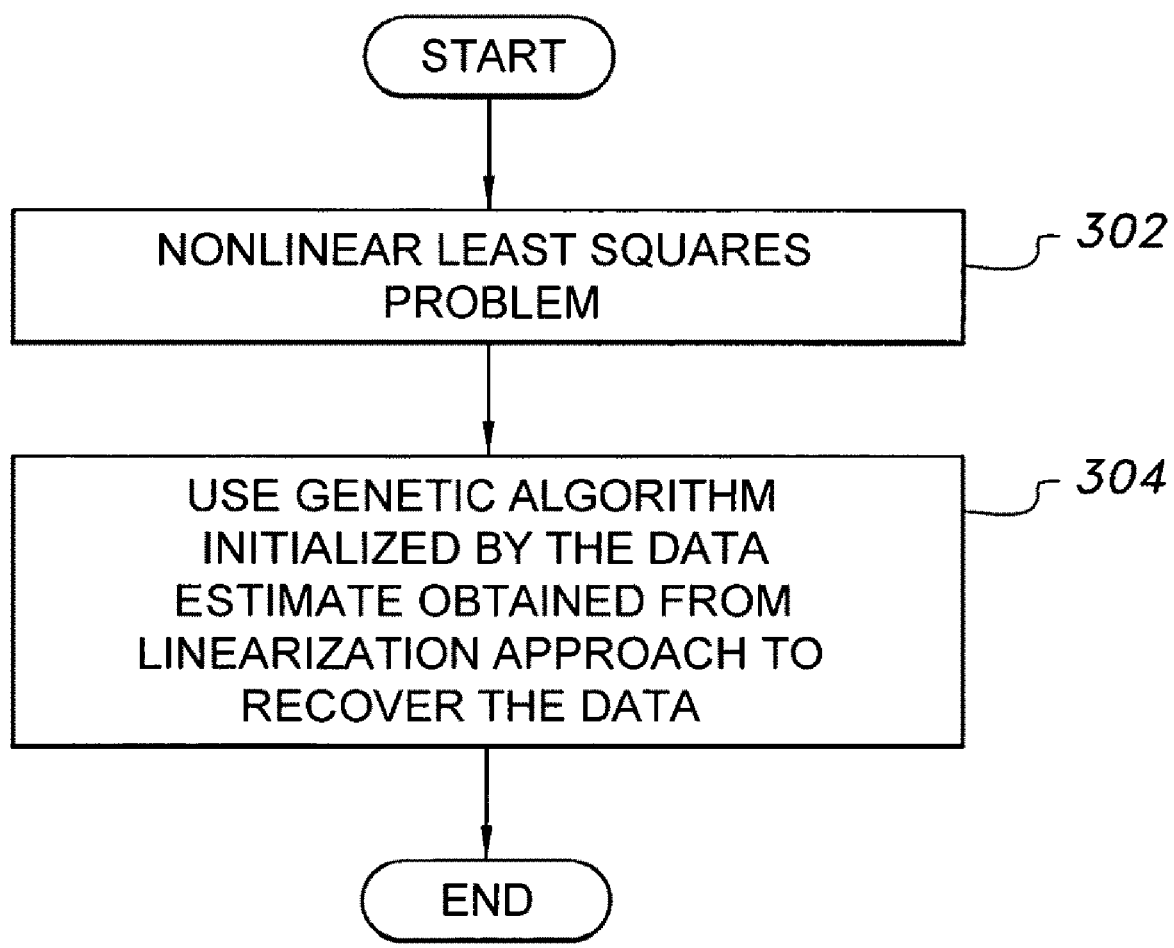
FIG. 3 is a flowchart showing use of a Genetic algorithm (GA) in the cyclic prefix enhanced data recovery method according to the present invention.

As shown in FIG. 3, the method described herein may use a Genetic algorithm (GA) to directly solve (step 302) the nonlinear problem described above. GA is a robust, population-based, computer executable, iterative, stochastic search algorithm that is based on natural selection (survival of the fittest) and evolution. The reason behind GA being widely used in optimization problems is its ability to avoid local minima.

A population of chromosomes (candidate solutions to the problem of size N in our case) is generated. Each chromosome has a fitness (a positive number) associated to it, which represents the goodness of the solution. The fitness in our case is calculated by evaluating the cost function for a particular chromosome. This fitness is used to determine the parent chromosomes that will produce the offspring in the next generation. This process is called selection. The selected parents are allowed to reproduce using the genetic operators called crossover and mutation. The parent chromosomes with the highest fitness values, known as elite chromosomes, are transferred to the next generation without any change, to be utilized again in reproduction. It is important to note that during the selection process, it is necessary to prevent incest (i.e., the two parents being selected for reproduction should not be same) to avoid local minima. As shown in FIG. 3, step 304, the GA is initialized by the data estimate obtained from linearization approach to recover the transmitted data. The process is terminated when a fixed number of iterations, called generations, are completed.

Figure 4:
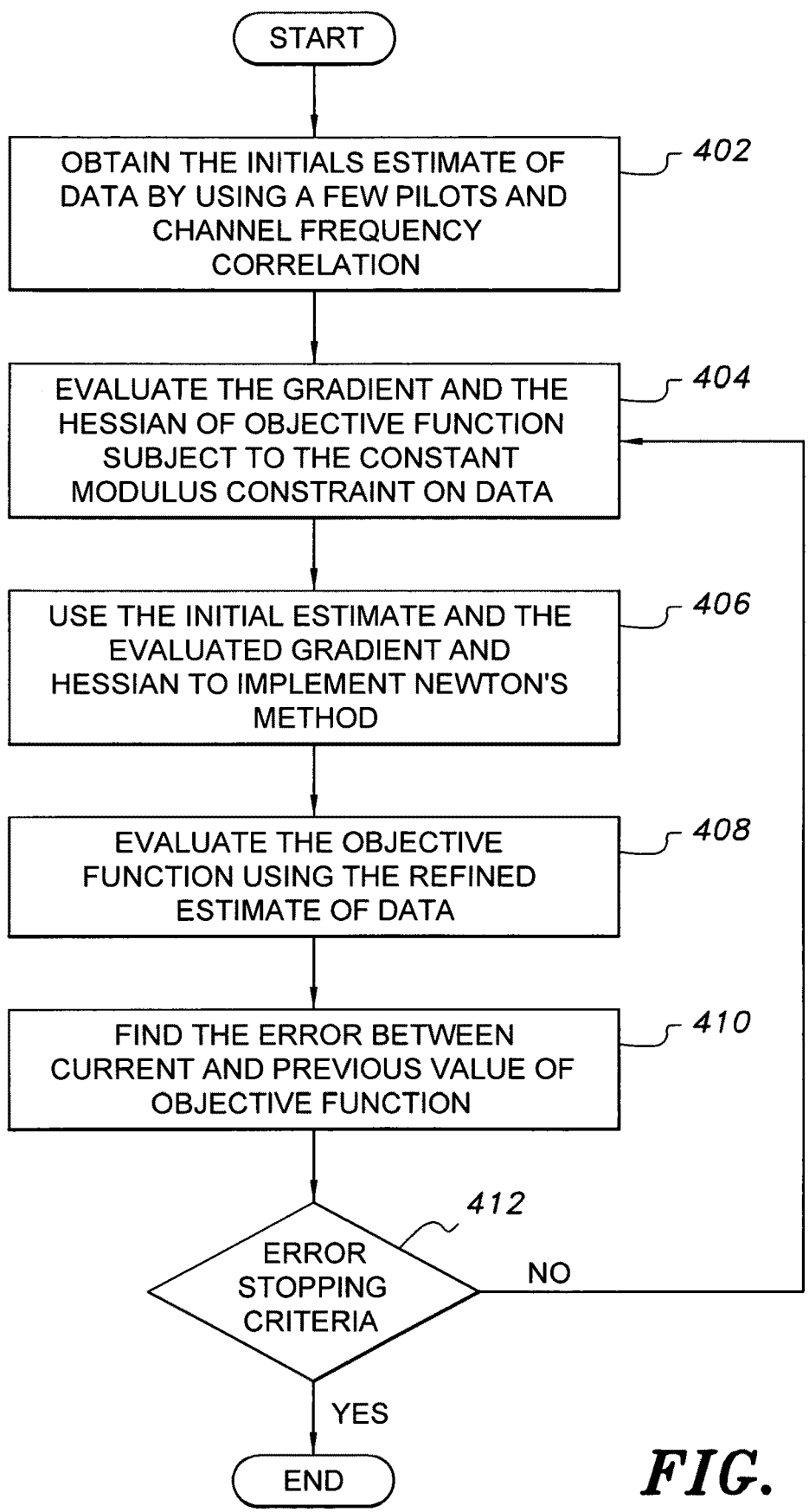
FIG. 4 is a flowchart showing how pilots can be used to reduce the computational complexity in the cyclic prefix enhanced data recovery method according to the present invention.

As shown in FIG. 4, pilots can be used to reduce the computational complexity. Specifically, at step 402, a few pilots are used to obtain an initial channel estimate, which is then enhanced using Newton's method. To this end, the objective function of concern is:

$$Z = \|\underline{y}_i - B X_i^* - C X_i^*\|^2 \quad (9)$$

subject to the constant modulus constraint, $\phi_j = |X_i(j)|^2 = E_x$ j=1, 2, ..., N, where $B = (1/E_x) \underline{X}_{Ui-1} Q_{L+1} D_Y$ and $C = (1/E_x) \underline{X}_{Li} Q_{L+1} D_Y$. Newton's method is applied to the following objective function:

$$Z + \frac{1}{\sigma_n^2} \sum_{j=1}^{N} \varphi_j \quad (10)$$

where $\phi_j = \|E_x - X_i^H E_j X_i\|^2$ and $E_j$ is a N×N matrix with all zero except for one nonzero diagonal element $e_{jj}$=1. If initial estimate of data $X_{-1}$ is available, then it can be refined by applying Newton's method, $$X_k = X_{k-1} - \mu [\nabla^2 Z(X_{k-1})]^{-1} [\nabla Z(X_{k-1})]^*, k \geq 0 \quad (11)$$

where $\mu$ is the step size, $\nabla$ stands for gradient, and $\nabla^2$ stands for Hessian of objective function.

Thus, at step 404, gradient and Hessian are evaluated subject to a constant modulus constraint on the data being processed. At step 406 an initial estimate and the evaluated gradient and Hessian are used to implement Newton's method. At step 408 the objective function is evaluated using the refined estimate of data computed at step 406. At step 410 an error is calculated between a current and previous value of objective function. Lastly, according to decision step 412, the algorithm runs iteratively until a maximum number of iterations or a stopping criterion is reached. Thus, to implement Newton's method, gradient and Hessian of the objective function are evaluated, which involve complex matrix differentiation.

Figure 5:
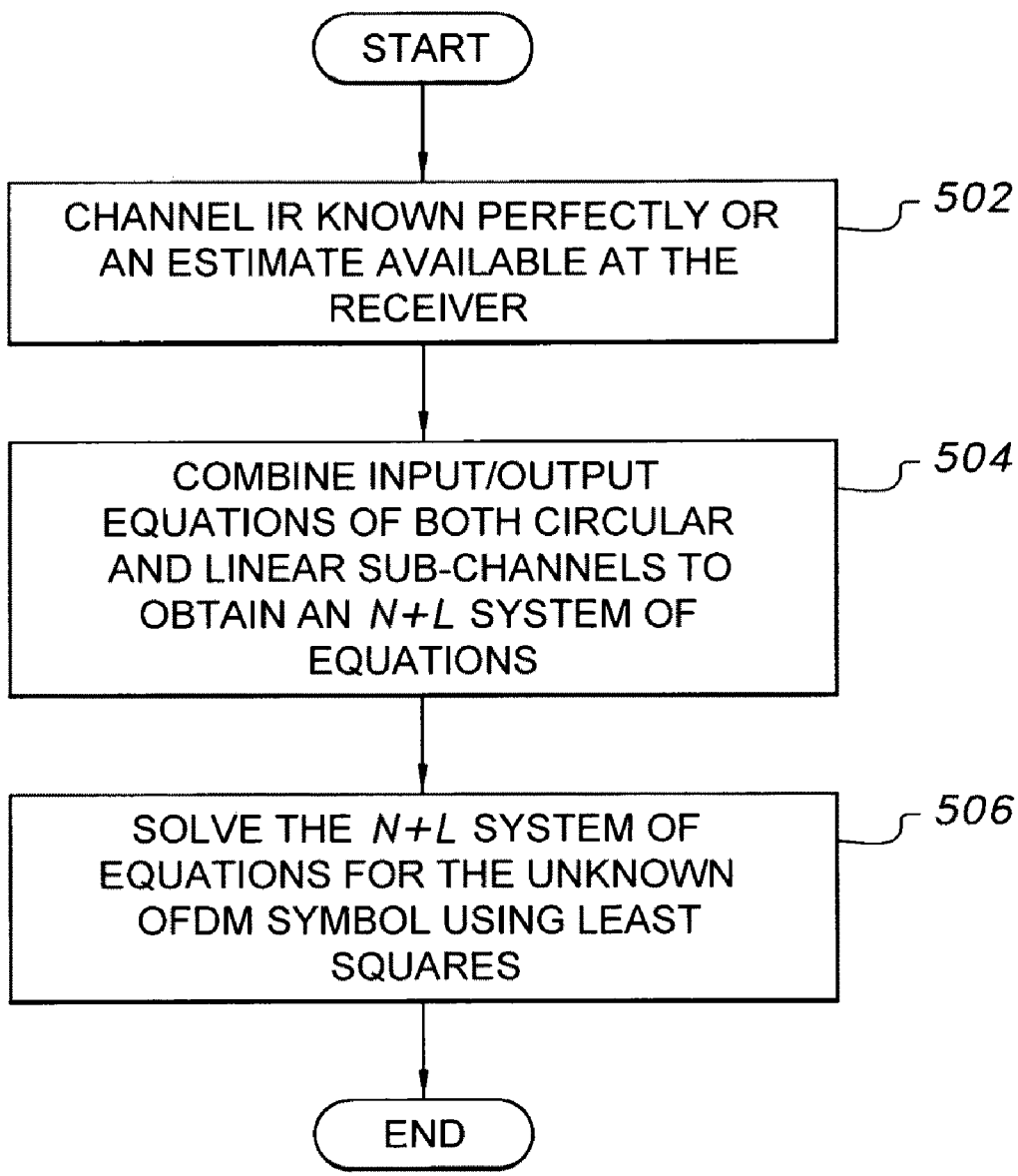
FIG. 5 is a flowchart showing how use of a cyclic prefix in the receiver enhances receiver performance using the cyclic prefix enhanced data recovery method according to the present invention.

As shown in FIG. 5, a flowchart illustrates how the CP can enhance the performance of the receiver when the channel is known perfectly or an estimate of it is available at the receiver. Step 502 executes when the channel is known perfectly or an estimate is available at the receiver. Instead of the conventional method of using only circular sub-channel for equalization, step 504 uses both the linear and circular sub-channels to enhance equalization. Starting with the input/output equations of linear and circular sub-channel, and by using the decomposition ($\underline{X}_i = \underline{X}_{Li} + \underline{X}_{Ui-1}$) and some simple mathematical manipulations, we obtain an N+L system of equations in the unknown OFDM symbol $X_i$ which, at step 506, is solved using least squares.

$$\begin{bmatrix} y_i \\ \underline{y}_i - x_{Ui-1} \underline{h}_i \end{bmatrix} = \begin{bmatrix} \text{diag}(\mathcal{H}_i) \\ H_L Q_{N-L+1} \end{bmatrix} X_i + \begin{bmatrix} \mathcal{N}_i \\ \underline{n}_i \end{bmatrix} \quad (12)$$

Figure 6:
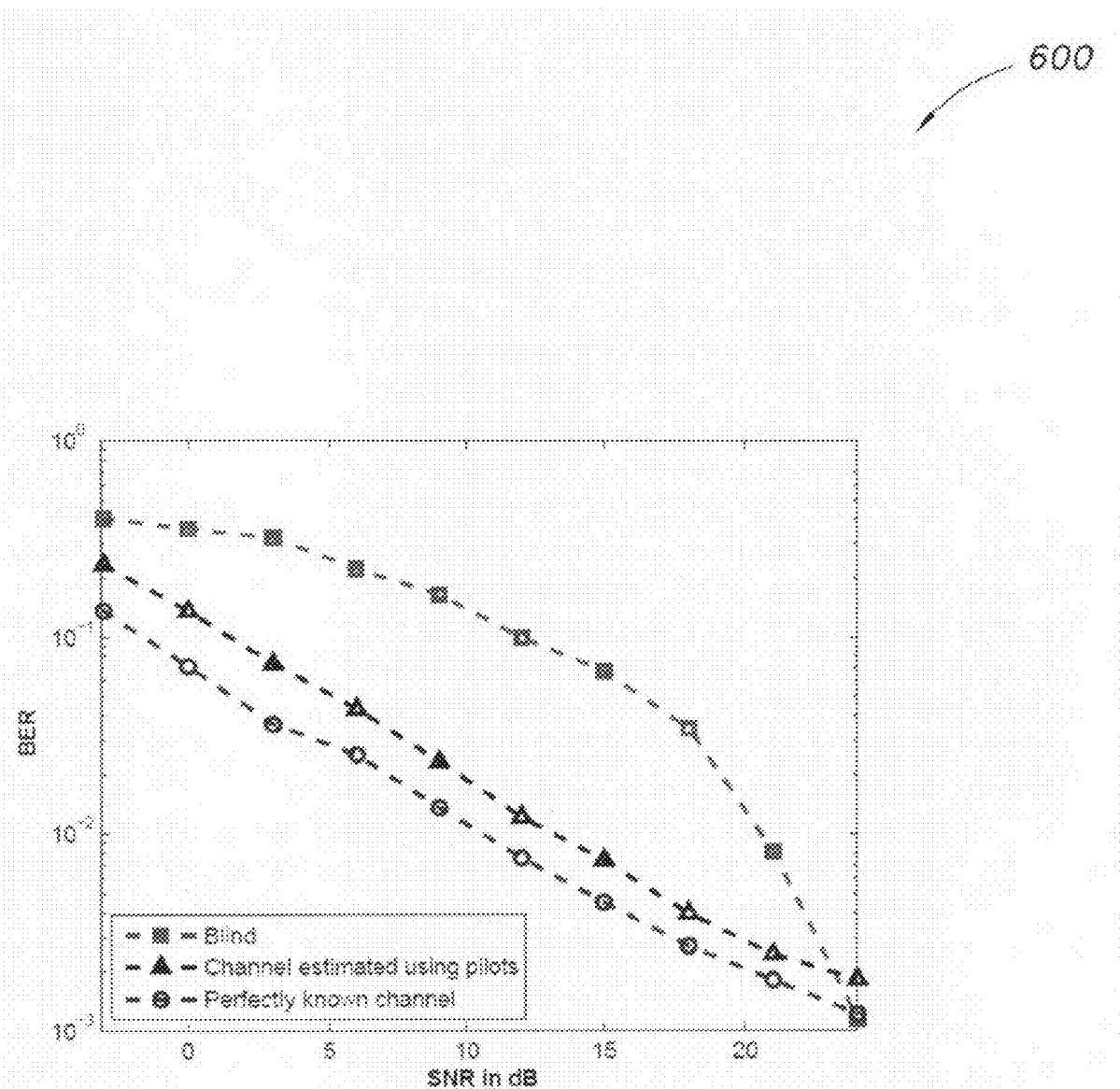
FIG. 6 is a plot showing Bit Error Rates of an OFDM system with N=16 and cyclic prefix of length L=4 (BPSK modulation).
Figure 7:
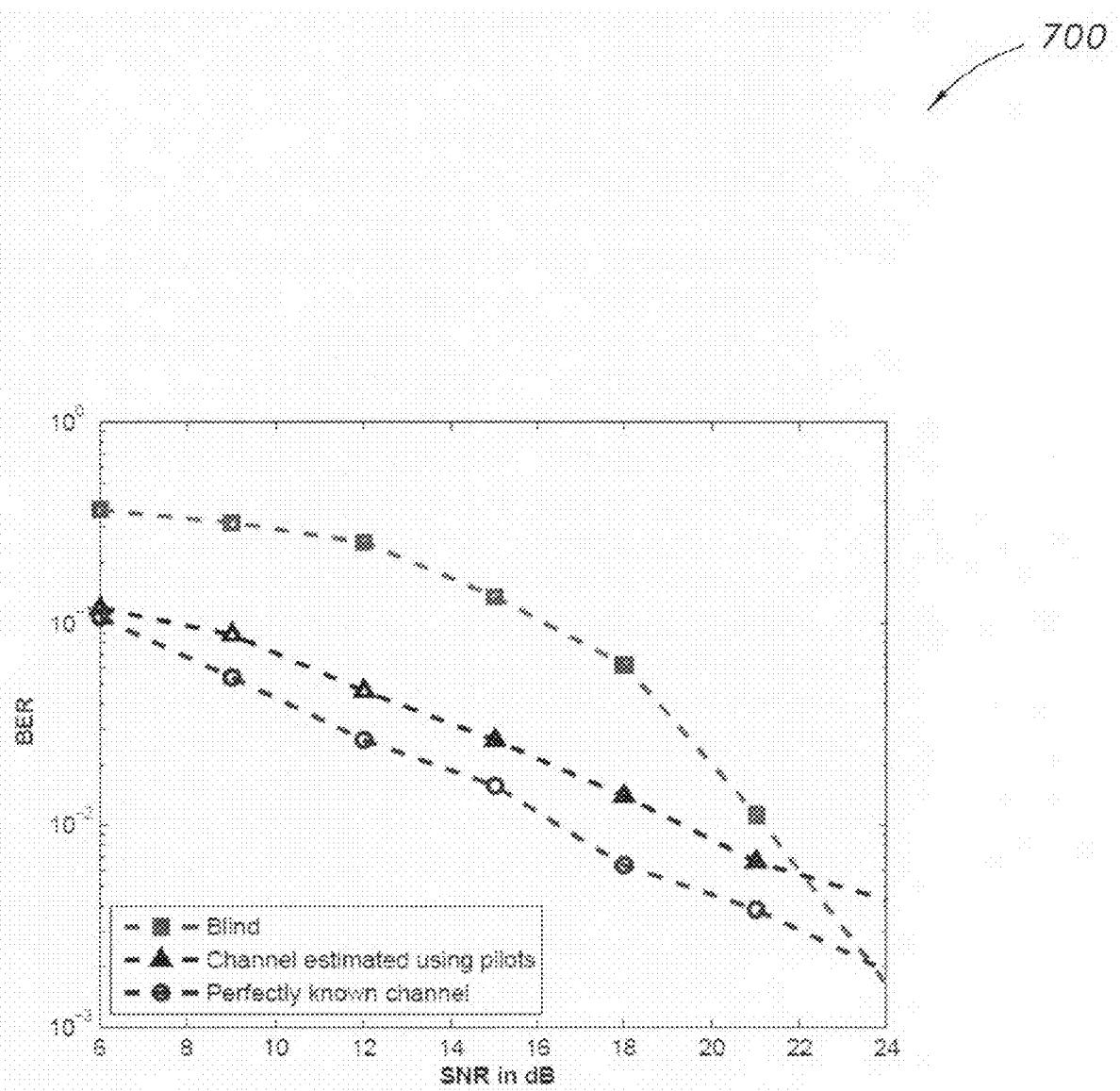
FIG. 7 is a plot showing Bit Error Rates of an OFDM system with N=16 and cyclic prefix of length L=4 (4QAM modulation).

As shown in FIG. 6, an OFDM system with N=16 and cyclic prefix of length L=4 is considered. The OFDM symbol is comprised of BPSK or 4-QAM symbols. The channel impulse response (IR) is comprised of five independent and identically distributed (iid) Rayleigh fading taps. The plot 600 illustrates and compares the BER performance of three methods: (i) Perfectly known channel, (ii) Channel estimated using L+1 pilots, and (iii) Blind based estimation using exhaustive search. As expected, the best performance is achieved by the perfectly known channel, followed by that obtained by training based estimated channel. However, in the high SNR region, the BER curve of blind-based estimation exhibits steeper slope (higher diversity), which can be explained from the fact that the two sub-channels (linear and circular) are used to detect the data in the blind case, whereas only the linear sub-channel is used in the pilot-based and known channel cases. An alternative way to see this is to note that a Rayleigh fading channel will occasionally hit a (near) zero on the FFT grid, resulting in a loss of the corresponding BPSK symbol. The blind case does not suffer from this, and thus demonstrates improved performance in higher SNR. The same conclusion is reached for the 4QAM case, as can be seen from plot 700 of FIG. 7.

Figure 8:
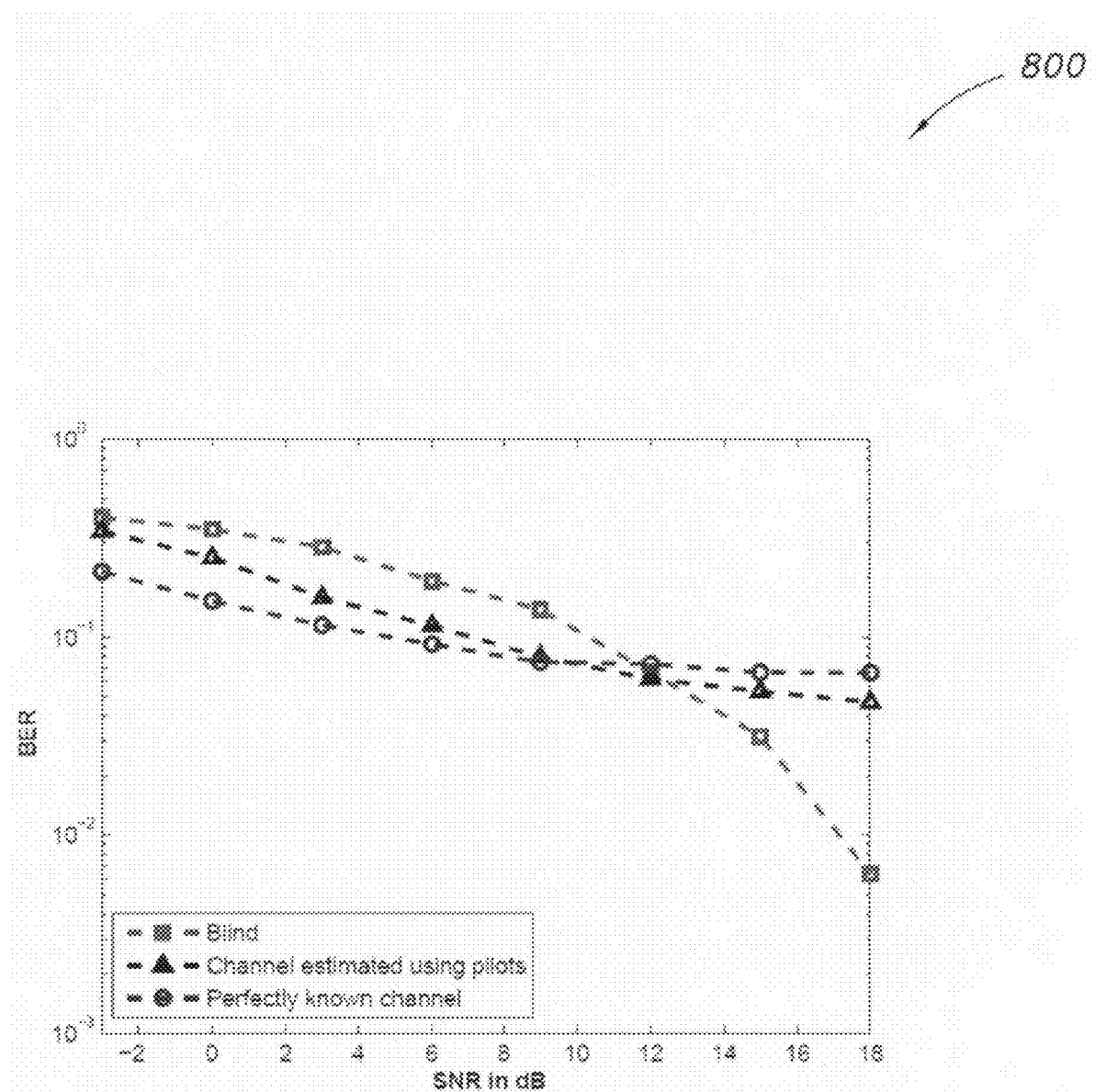
FIG. 8 is a plot showing Bit Error Rates in the case when the simulated channel has persistent zeros on the FFT grid.
Figure 9:
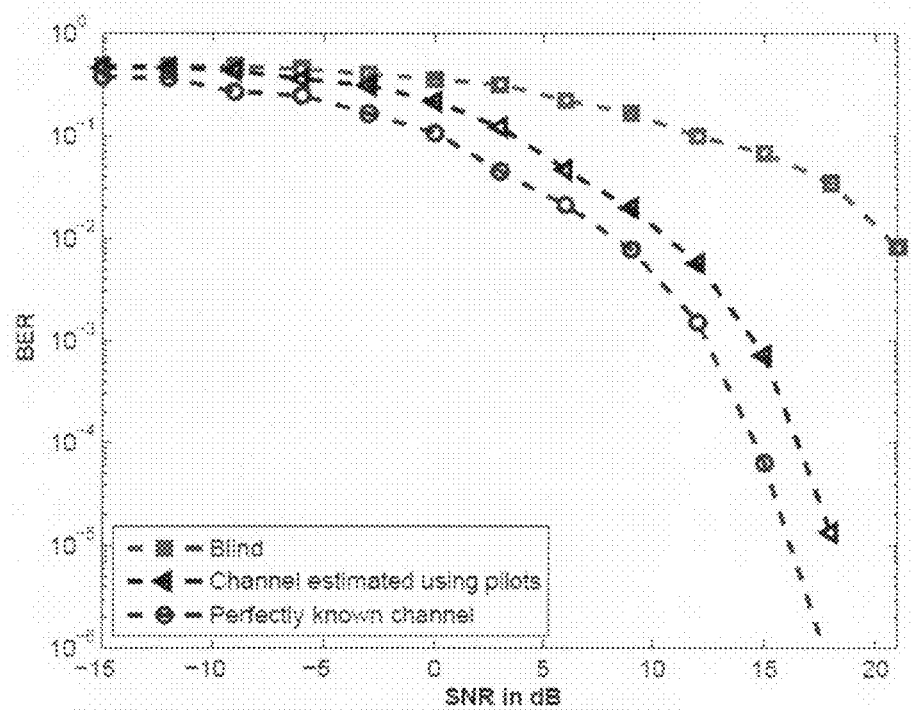
FIG. 9 is a plot showing Bit Error Rates in the case when the simulated channel is constant and non-fading.

Plot 800 in FIG. 8 indicates that the blind method behaves favorably in high SNR by simulating the behavior of an OFDM system in the case where the channel has persistent zeros on the FFT grid. The three approaches are compared for BPSK modulated data when the channel IR has persistent zeros on the FFT grid. It should be understood that at high SNR, the BER for the perfectly known channel and that of the estimated channel reach an error floor. The blind method does not suffer from this problem, and thus it outperforms the other two cases when the channel has persistent nulls. On the other hand, when the simulations are run over a constant (non-fading) channel (FIG. 9), the perfectly known channel consistently outperforms the blind method for all ranges of SNR. The three instances of fading channel, constant channel, and channel with persistent zeros, point to the fact that the blind method enhances the diversity of the OFDM system.

Figure 10:
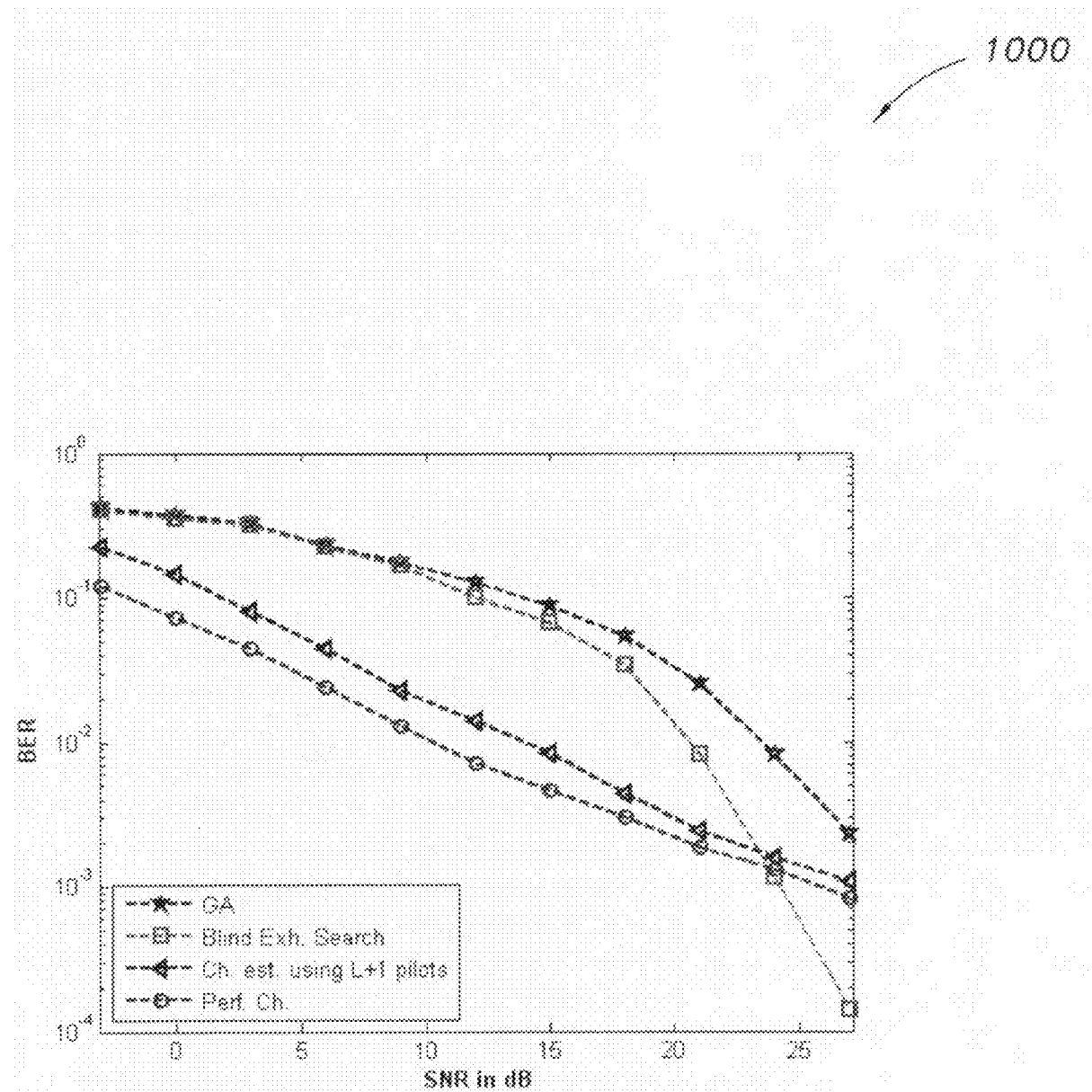
FIG. 10 is a plot showing Bit Error Rates for BPSK modulated data over a Rayleigh fading channel.

FIG. 10 shows the performance of the Genetic algorithm for BPSK modulated data over a Rayleigh fading channel. The parameters used in implementing the Genetic algorithm are listed in Table I. It can be observed from plot 1000 of FIG. 10 that Genetic algorithm performs quite close to the blind exhaustive search.

TABLE I

Simulation Parameters Used to Implement Genetic Algorithm

| | |
|---|---|
| Symbol Initialization | Random |
| Population Size | 200 |
| Number of Generations | 150 |
| Selection Method | Fitness-Proportionate |
| Incest Prevention | Enabled |
| Cross-over Scheme | Uniform Cross-over |
| Mutation Scheme | Uniform Mutation |
| Mutation Probability | 0.15 |
| Number of Elite Chromosomes | 20 |

Figure 11:
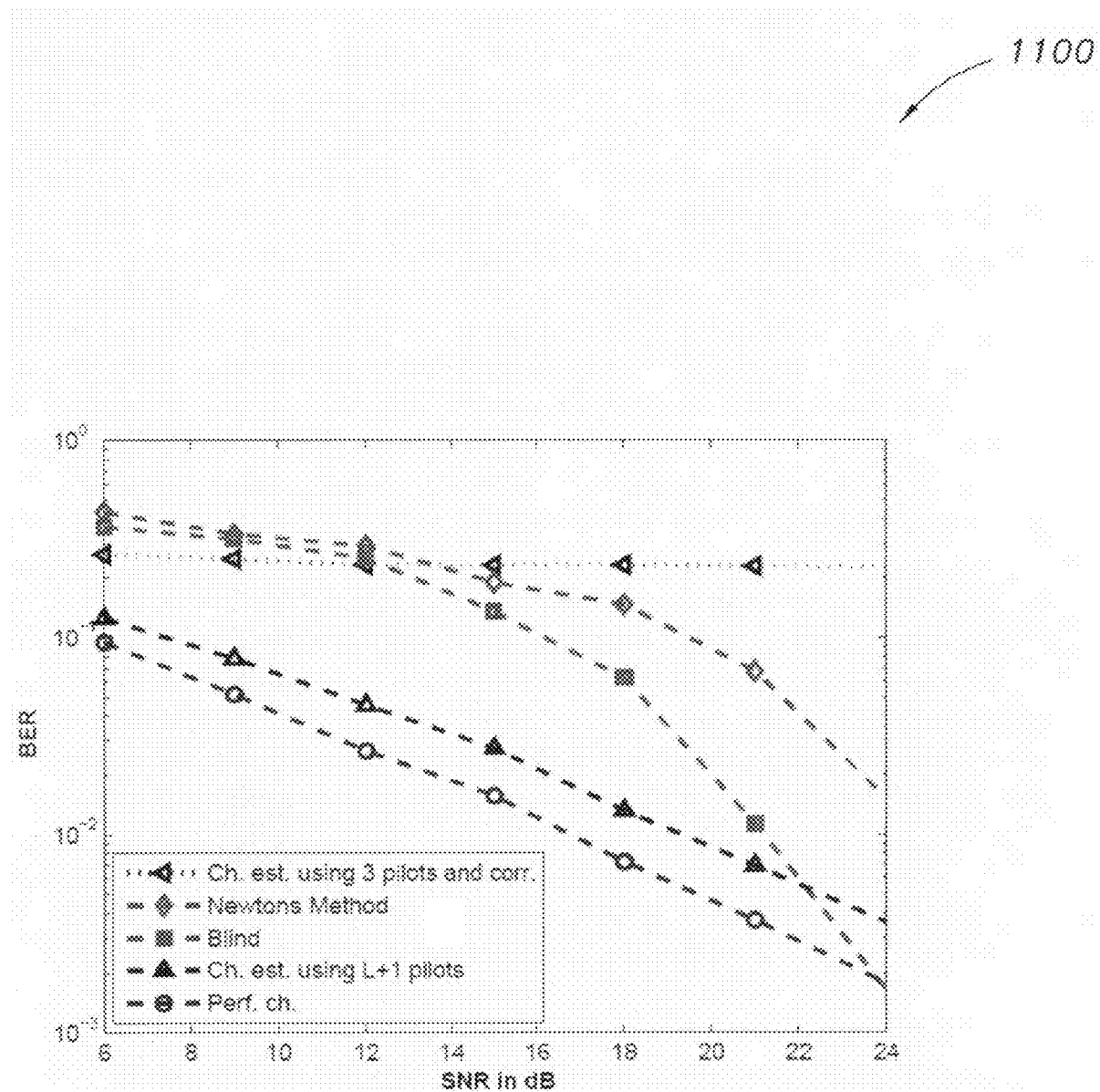
FIG. 11 is a plot showing Bit Error Rates for Newton's method (step size of 0.5, stopping criteria $10^{-6}$) for 4-QAM with N=16 and L=4.
Figure 12:
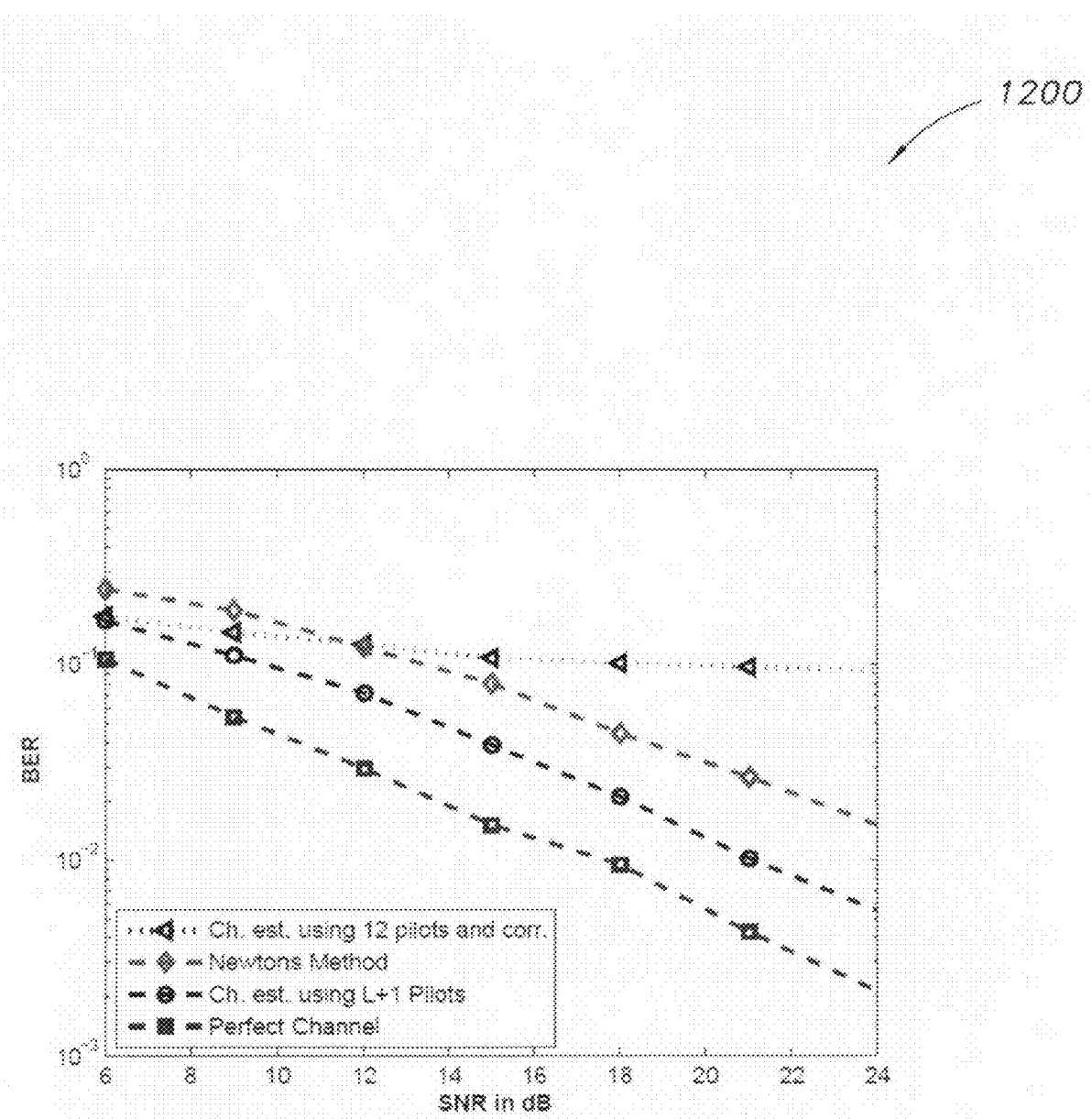
FIG. 12 is a plot showing Bit Error Rates in which performance of Newton's method is compared with the L+1 pilots case and perfectly known channel for more realistic OFDM system using 4-QAM with N=64 and L=16.

Plot 1100 of FIG. 11 shows the performance of Newton's method (step size of 0.5, stopping criteria $10^{-6}$) for 4-QAM with N=16 and L=4 when it is initialized by the estimate obtained by using 3 pilots and channel correlation. It can be seen that the 3 pilots-based method reaches an error floor at high SNR, while the Newton's method performs quite close to the blind exhaustive search. In FIG. 12, the graph 1200 illustrates performance of Newton's method compared with the L+1 pilots case and perfectly known channel for more realistic OFDM system using 4-QAM with N=64 and L=16. The Newton's method is initialized with an estimate obtained by using 12 pilots and channel correlation. The plot 1200 indicates that Newton's method performs quite well even for higher number of carriers.

Figure 13:
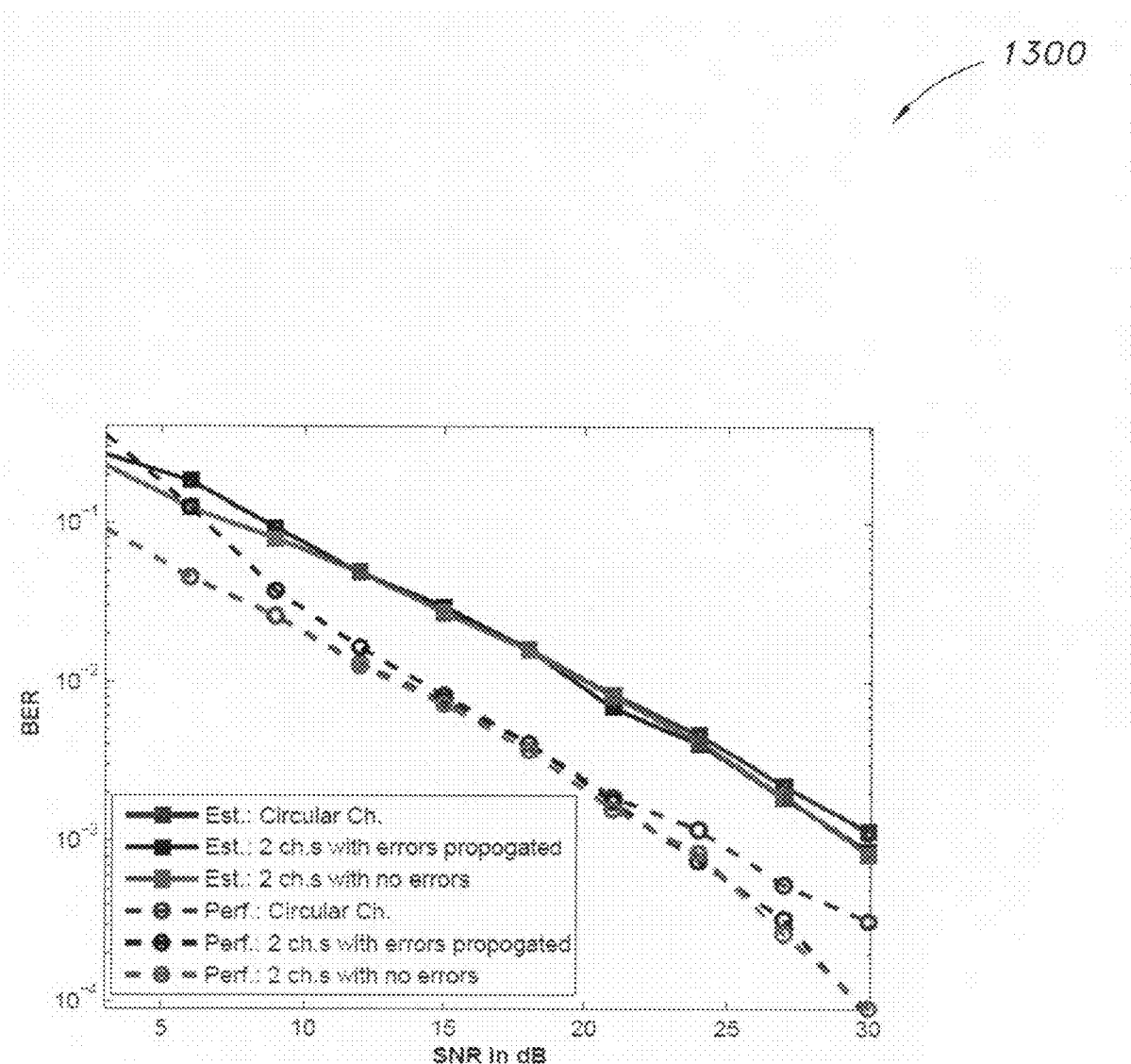
FIG. 13 is a plot showing Bit Error Rates illustrating the advantages of enhanced equalization using a cyclic prefix in the receiver.

As shown in FIG. 13, a graph 1300 illustrates the advantages of enhanced equalization using CP. A more realistic OFDM system with N=128 and cyclic prefix of length L=32 is considered. The channel impulse response (IR) comprises 33 (iid) Rayleigh fading taps and the OFDM symbol comprises BPSK modulated data. It is assumed that the receiver either knows the channel perfectly or estimates it using L+1 pilots. The performance of the receiver is compared in the three scenarios when (i) data is detected using only the circular sub-channel, (ii) data is detected using both the circular and linear sub-channels with error propagation (i.e., the error corrupted symbol detected in the current iteration is used as it is in the next iteration), and (iii) data is detected using both the channels with no error propagation (i.e., it is assumed that the previous symbol has been recovered perfectly before using it for detecting the current symbol).

Figure 14:
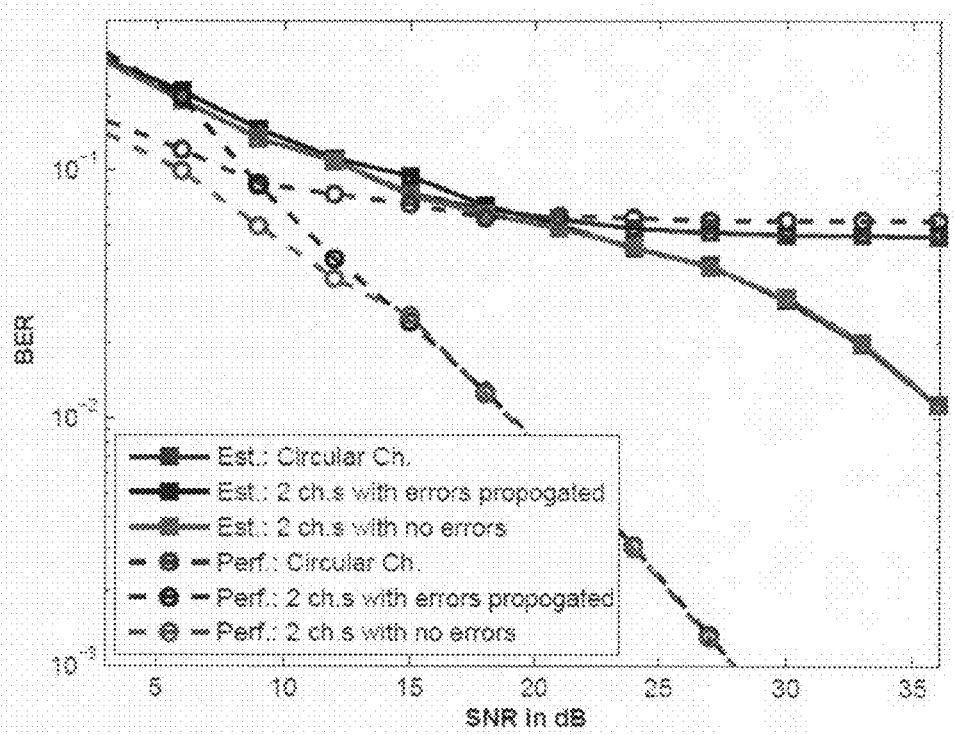
FIG. 14 is a plot that compares the performance of the receiver with enhanced equalization using the cyclic prefix versus the conventional one using only circular sub-channel when channel IR has zeros on FFT grid.

As shown in plot 1400 of FIG. 14, the performance of the receiver improves when both sub-channels are used for data recovery. The improvement is quite significant at high SNR. It can also be noticed that the case of error propagation does not perform well at low SNR but as the SNR increases, its performance is improved and becomes equal to the case of no error propagation.

Figure 15:
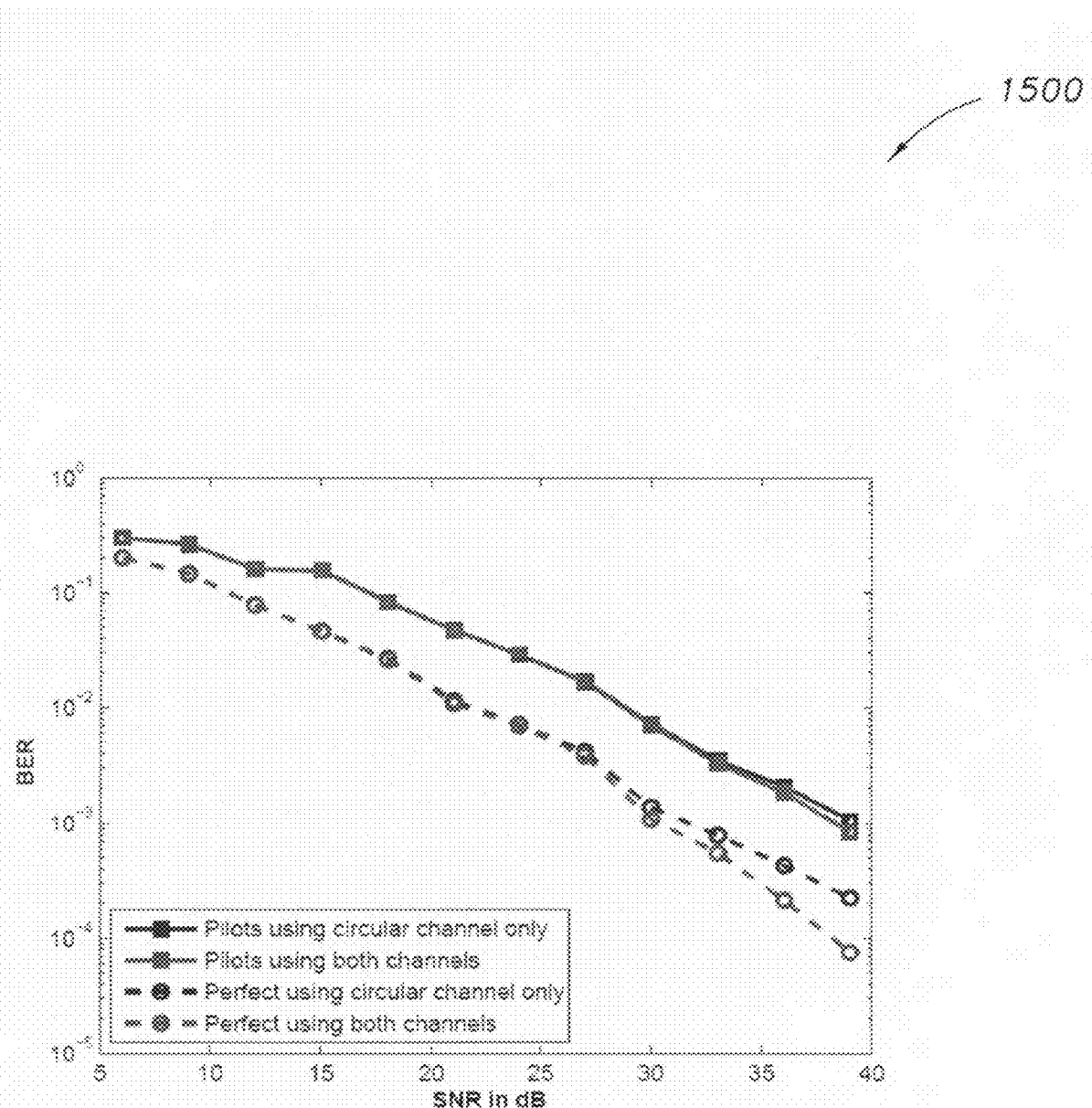
FIG. 15 is a plot that illustrates that the advantage of enhanced equalization is not limited to the constant modulus case.

A graph 1500 of FIG. 15 compares the performance of the receiver with enhanced equalization using CP with the conventional one using only circular sub-channel when channel IR has zeros on FFT grid. The conventional method reaches an error floor as expected. No such error floor is observed if both the linear and circular sub-channels are used for data detection. The performance of the case when errors are propagated improves with increasing SNR.

Figure 16:
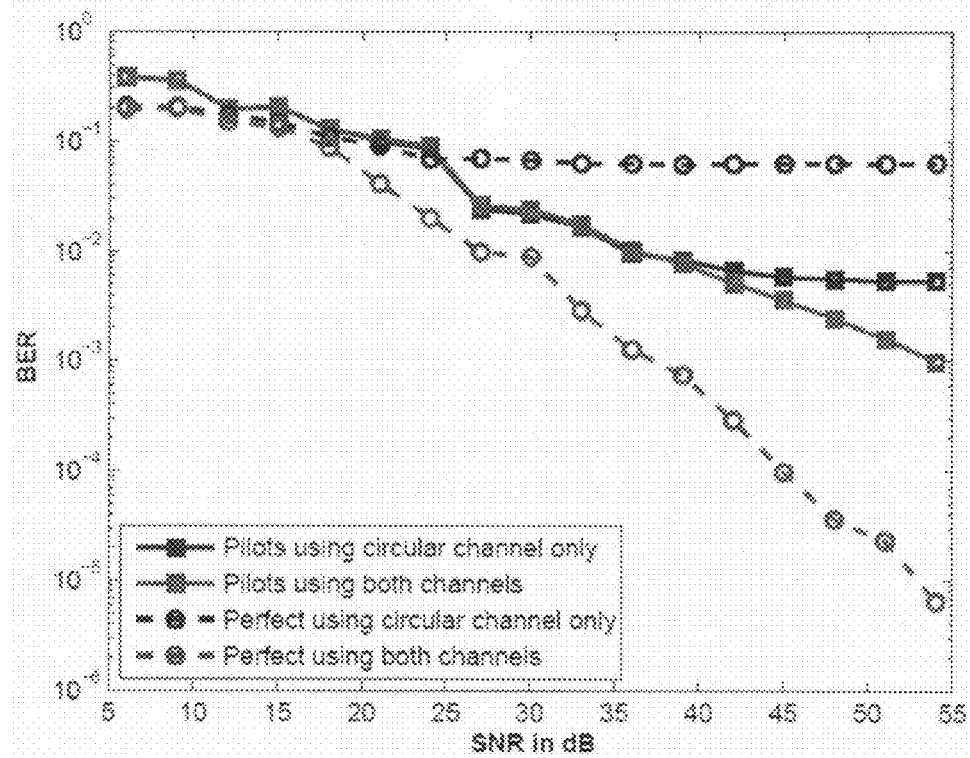
FIG. 16 is a plot that illustrates the performance of enhanced equalization for 16QAM modulated data.

From reviewing plot 1500, it should be understood that the advantage of enhanced equalization is not limited to the constant modulus case. Rather, the cyclic prefix can be used as easily for enhanced equalization in the non-constant modulus case. As shown in FIG. 16, the plot 1600 shows the performance of enhanced equalization for 16 QAM modulated data with a non-constant modulus. The trends are the same as those of the constant modulus case of FIG. 13. The persistent channel zeros case shown in FIG. 16 reveals the same trends as for the constant modulus case.

The cyclic prefix-based enhanced data recovery method provides a blind estimate of the data from one output symbol without the need for training or averaging (contrary to the common practice where averaging over several symbols is required). Thus, the method lends itself to block fading channels. Data detection is done without any restriction on the channel (as long as the delay spread is shorter than the (CP)). Data detection can be performed even in the presence of zeros on the FFT grid. The fact that two observations (the OFDM symbol and CP) are used to recover the input symbol enhances the diversity of the system.

It is to be understood that the present invention is not limited to the embodiment described above, but encompasses any and all embodiments within the scope of the following claims.

We claim:

1. A cyclic prefix-based enhanced data recovery method, comprising the steps of:

receiving data including orthogonal frequency division multiplexed (OFDM) symbols transmitted through a wireless linear channel of length L+1, wherein L is an integer, wherein each symbol has a length N, where N is an integer;

transforming the linear channel into a circular sub-channel and a linear sub-channel;

in a detector circuit, separating a cyclic prefix from the received orthogonal frequency division multiplexed symbols;

establishing a variable $\underline{y}_i$, wherein $\underline{y}_i$ represents a cyclic prefix of output of the linear sub-channel at a particular time i, wherein $\underline{y}_i$ is given by $\underline{y}_i = \underline{X}_i \underline{h}_i + \underline{n}_i$, where $\underline{h}_i$ represents a channel effect of the transmitted data at the time i, $\underline{n}_i$ represents noise of the transmitted data, and $\underline{X}_i$ is a matrix given by $\underline{X}_i = \underline{X}_{Li} + \underline{X}_{Ui-1}$, where $\underline{X}_{Li}$ is a matrix composed of cyclic prefixes of current unknown OFDM symbols $\underline{x}_i$ and $\underline{X}_{Ui-1}$ is a matrix composed of cyclic prefixes of previous known OFDM symbols $\underline{x}_{i-1}$, where $$\underline{X}_{Li} = \begin{pmatrix} \underline{x}_i(0) & 0 & \cdots & 0 \\ \underline{x}_i(1) & \underline{x}_i(0) & \cdots & 0 \\ \vdots & \ddots & \ddots & \vdots \\ \underline{x}_i(L-1) & \cdots & \underline{x}_i(0) & 0 \end{pmatrix} \text{ and}$$

$$\underline{X}_{Ui-1} = \begin{pmatrix} 0 & \underline{x}_{i-1}(L-1) & \cdots & \underline{x}_{i-1}(0) \\ 0 & 0 & \cdots & \underline{x}_{i-1}(1) \\ \vdots & \ddots & \ddots & \vdots \\ 0 & \cdots & 0 & \underline{x}_{i-1}(L-1) \end{pmatrix};$$

establishing a variable $x_i$, wherein $x_i$ represents a cyclic prefix of output of the circular sub-channel at the time i, wherein $x_i$ is a length-N, zero-padded version of $\underline{x}_i$;

performing FFT of the received OFDM symbols without the cyclic prefix;

recovering the data by maximum likelihood estimation using the cyclic prefix and the received OFDM symbols, wherein a blind method for channel estimation is utilized, thereby making collective use of natural constraints of a wireless communications protocol and channel;

refining the data by a refinement method comprising the steps of:

obtaining an initial estimate using a plurality of pilots and frequency correlation;

establishing an objective function Z;

obtaining a gradient of the objective function Z subject to a constant modulus constraint on data given by $\phi_j = |\chi_{x,i}(j)|^2 = E_x$ for integer j=1, 2, 3, ... N, wherein $Z = \|y_i - B\chi_i^* - C\chi_i^*\|^2$, where $\chi_i$ is an N-point FFT of the $x_i$, $\chi_i^*$ is a convolution of $\chi_i$, $B = (1/E_x)\underline{X}_{Ui-1} Q_{L+1} D_Y$ and $C = (1/E_x)\underline{X}_{Li} Q_{L+1} D_Y$, $Q_{L+1}$ represents the first L+1 rows of an inverse FFT matrix Q, and $D_Y$ is a diagonal matrix with elements on the diagonal being equal to N-point FFT of $y_i$;

obtaining a Hessian of the objective function subjected to the constant modulus constraint on data;

using the gradient and the Hessian in Newton's method.

2. The cyclic prefix-based enhanced data recovery method according to claim 1, wherein performance of the maximum likelihood estimation includes minimizing a norm over all possible combinations of the received data.

3. The cyclic prefix-based enhanced data recovery method according to claim 2, wherein the norm depends on input and output data only.

4. The cyclic prefix-based enhanced data recovery method according to claim 1, wherein the constraints include a finite delay spread constraint on the wireless linear channel, a finite alphabet constraint on data, and the cyclic prefix.

5. The cyclic prefix-based enhanced data recovery method according to claim 1, further comprising the step of processing block fading channels.

6. The cyclic prefix-based enhanced data recovery method according to claim 1, further comprising the step of detecting symbols for channels with zeros on an FFT grid.

7. The cyclic prefix-based enhanced data recovery method according to claim 1, wherein data is detected in presence of channel nulls.

8. A cyclic prefix-based enhanced data recovery method, comprising the steps of:

receiving data including orthogonal frequency division multiplexed (OFDM) symbols transmitted through a wireless linear channel of length L+1, wherein L is an integer, wherein each symbol has a length N, where N is an integer;

transforming the linear channel into a circular sub-channel and a linear sub-channel;

in a detector circuit, separating a cyclic prefix from the received orthogonal frequency division multiplexed symbols;

establishing a variable $\underline{y}_i$, wherein $\underline{y}_i$ represents a cyclic prefix of output of the linear sub-channel at a particular time i, wherein $\underline{y}_1$ is given by $\underline{y}_i = \underline{X}_i \underline{h}_i + \underline{n}_i$, where $\underline{h}_i$ represents a channel effect of the transmitted data at the time i, $\underline{n}_i$ represents noise of the transmitted data, and $\underline{X}_i$ is a matrix given by $\underline{X}_i = \underline{X}_{Li} + \underline{X}_{Ui-1}$, where $\underline{X}_{Li}$ is a matrix composed of cyclic prefixes of current unknown OFDM symbols $\underline{x}_i$ and $\underline{X}_{Ui-1}$ is a matrix composed of cyclic prefixes of previous known OFDM symbols $\underline{x}_{i-1}$ where $$\underline{X}_{Li} = \begin{pmatrix} \underline{x}_i(0) & 0 & \cdots & 0 \\ \underline{x}_i(1) & \underline{x}_i(0) & \cdots & 0 \\ \vdots & \ddots & \ddots & \vdots \\ \underline{x}_i(L-1) & \cdots & \underline{x}_i(0) & 0 \end{pmatrix} \text{ and}$$

$$\underline{X}_{Ui-1} = \begin{pmatrix} 0 & \underline{x}_{i-1}(L-1) & \cdots & \underline{x}_{i-1}(0) \\ 0 & 0 & \cdots & \underline{x}_{i-1}(1) \\ \vdots & \ddots & \ddots & \vdots \\ 0 & \cdots & 0 & \underline{x}_{i-1}(L-1) \end{pmatrix};$$

establishing a variable $x_i$, wherein $x_i$ represents a cyclic prefix of output of the circular sub-channel at the time i, wherein $x_i$ is a length-N, zero-padded version of $\underline{x}_i$;

performing FFT of the received OFDM symbols without the cyclic prefix;

recovering the data by a Genetic process using the cyclic prefix and the received symbols, wherein a blind method for channel estimation is utilized, thereby making collective use of natural constraints of a wireless communications protocol and channel, the Genetic process comprising the steps of:

obtaining an initial estimate using a plurality of pilots and frequency correlation;

establishing an objective function Z;

obtaining a gradient of the objective function Z subject to a constant modulus constraint on data given by $\phi_j = |\chi_i(j)|^2 = E_x$ for integer $j = 1, 2, 3, \ldots N$, wherein $Z = \|\underline{y}_i - B\chi_i^* - C\chi_i^*\|^2$, where $\chi_i$ is an N-point FFT of $x_i$, $\chi_i^*$ is a convolution of $\chi_i$, $B = (1/E_x)\underline{X}_{Ui-1}Q_{L+1}D_Y$ and $C = (1/E_x)\underline{X}_{Li}Q_{L+1}D_Y$, $Q_{L+1}$ represents the first $L+1$ rows of an inverse FFT matrix Q, and $D_Y$ is a diagonal matrix with elements on the diagonal being equal to N-point FFT of $y_i$;

obtaining a Hessian of the objective function subjected to the constant modulus constraint on data;

using the gradient and the Hessian in Newton's method.

9. The cyclic prefix-based enhanced data recovery method according to claim 8, wherein data is detected in presence of channel nulls.

\* \* \* \* \*